June 20, 1967  L. A. KAMENTSKY  3,327,119
METHOD AND APPARATUS FOR DETECTING CANCER CELLS
Filed March 26, 1964

INVENTOR.
LOUIS A. KAMENTSKY
BY
ATTORNEY

United States Patent Office 3,327,119
Patented June 20, 1967

3,327,119
METHOD AND APPARATUS FOR DETECTING CANCER CELLS
Louis A. Kamentsky, Briarcliff Manor, N.Y., assignor to International Business Machines Corporation, New York, N.Y., a corporation of New York
Filed Mar. 26, 1964, Ser. No. 355,030
16 Claims. (Cl. 250—83.3)

The invention relates generally to methods and apparatus for diagnosing diseases and more particularly to methods and apparatus for detecting cancer in human and animal organisms.

A widely-used technique for reliably analyzing smears of body fluids is described in a publication entitled: Diagnosis of Uterine Cancer by the Vaginal Smear by G. N. Papanicolaou and H. F. Trout, published by Commonwealth Fund, New York, 1943. Further information describing this technique is found in a publication entitled: Atlas of in Situ Cytology by S. Charles Kasdon and Sophia B. Bamford, published by Little, Brown and Co., Boston, 1962. This procedure is commonly referred to as the Papanicolaou technique. Cancer cells which are exfoliated into body fluids are detectable upon microscopic analysis of stained smears of the body fluid by highly-trained personnel. This procedure enables certain types of cancer to be detected at an early and curable stage. Using the Papanicolaou procedure, cancer cells are distinguished from normal cells using several interrelated criteria including:

(1) Nuclear diameter, which is generally larger for cancer cells (2) Cytoplasmic diameter, which is generally smaller for cancer cells (3) Nuclear shape, which is often irregular for cancer cells (4) Amount of nuclear chromatin, where the nucleus contains a higher level due to the presence of more deoxyribonucleic acid (DNA) and ribonucleic acid (RNA) for cancer cells (5) Amount of cytoplasmic stain density, where the cytoplasm contains a higher level due to the presence of more RNA for cancer cells (6) Nuclear inhomogeneity, where clumping of chromatin occurs in cancer cells (7) The relative parameters (above) with respect to average parameters in the sample (8) Isolation of cells, where cancer cells tend to isolate.

The success of this cancer detection technique in diagnosing cancer, often at an early and curable stage, makes it highly desirable to extend the technique to a mass examination of the human population. The utility of the techniques is limited, however, by the requirement of highly-trained personnel employed in a time-consuming and tedious task. Their procedure is outlined in a publication entitled, A Manual of Cytotechnology, published by the National Committee for Careers in Medical Technology, 1962, and represents the result of a cooperative effort of group of experts in this field of medicine. Because of the complexity of cancer diagnosis using these techniques, widespread testing is virtually impossible without some degree of automation which would at least indicate the clearly negative cases so that the cytotechnologist need only be concerned with a fraction of the total cases.

An attempt has been made to automate the screening process based on measurements of the size and visible light absorption of the nuclei of specially stained and isolated cells and is described in a publication entitled, Exfoliated Cell Studies and the Cytoanalyzer, by E. G. Diacumakos, Emerson Day and M. J. Kopac, published in the Annals of the New York Academy of Sciences, volume 97, article 2, June 5, 1962, at pages 498–513. Another attempt to automate the screening process based on the fluorscence of cells stained with a fluorescent dyestuff is described in a publication entitled, A Microfluorometric Scanner for the Differential Detection of Cells: Application to Exfoliative Cytology, by Robert C. Mellors and Reuben Silver, published in Science, volume 114, Oct. 5, 1951, at pages 356–360. Neither of these studies is known to have resulted in successful automation devices.

Present pattern recognition systems are generally incapable of recognizing cancer cells based on the Papanicolaou technique because there are often only subtle differences between cancer and normal cells utilizing the above described parameters and diagnosis is nearly intuitive in some cases. Thus, a system than can reliably recognize printed characters and similar data, for instance, cannot yet reliably recognize cell patterns. Present technology does, however, have certain capabilities which exceed the power of human visual inspection. Instrumentation is available which is capable of simultaneously examining two or more responses, measuring distances very precisely, operating with energy frequencies that are outside of the visual spectrum, accurately measuring the intensity of minute portions of energy patterns, operating at tremendous speeds, etc. Thus, the problem of automating cancer detection can best be solved by deriving a non-subtle distinction between cancer and normal cells that falls within the capabilities of such instrumentation. In the present invention a significant distinction between cancer and normal cells is used to provide a reliable diagnostic technique and instrumentation to automate the diagnosis is shown and described.

In the present invention, cancer cells are distinguished from normal cells by measurements of the relative amount of nucleic acids (DNA and RNA) in the cells. The measurements rely on the total absorption of ultraviolet light energy at certain wavelengths by nucleic acids. Ultraviolet light adsorption by nucleic acids and proteins and the correlation between the increase of the concentration of cytoplasmic nucleic acid with the increase in the rate of protein synthesis is described in publications entitled, Microspectrometry of Living and Fixed Cells by H. G. Davies and P. M. B. Walker, in Progress in Biophysics and Biophysical Chemistry, Edited by J. A. V. Butler and J. T. Randall, vol. 3, 1953, published by Academic Press, New York, Chapter 7, at pages 195–236; and The Ultraviolet Spectrum of Deoxyribonucleic Acids and Their Constituents, by E. Fredericq, A. Oth and F. Fontaine, in the Journal of Molecular Biology, volume 3, 1961, at pages 11–17. Ultraviolet absorption measurements and comparisons for cancer and normal squamous cells is described in publications entitled, Nucleic Acid Content of the Squamous Cancer Cell by Robert C. Mellors, John F. Keane, Jr., and G. N. Papanicolaou in Science, volume 116, Sept. 12, 1952, at pages 265–269; and The Reflecting Microscope, by Robert C. Mellors in Science, volume 112, Oct. 6, 1950, at pages 381–388. Two additional related references are: The Use of Television and Scanning Techniques for Ultraviolet Irradition Studies of Living Cells, by P. O'B. Montgomery and L. L. Hundley, in the Institute of Radio Engineers (now Institute of Electrical and Electronics Engineers) Transactions on Medical Electronics, July 1960, at pages 135–138; and Ultraviolet Television Color—Translating Microscope, by V. K. Zworykin and Fred L. Hatke, in Science, volume 126, Oct. 15, 1957, at pages 805–810.

The present invention utilizes information which is related to the following data and is described in the above-cited references:

(1.) Both RNA and DNA absorb ultraviolet light energy with an absorption maximum at about 2600 A. in a range of from 2500 to 2800 A.

(2) Certain proteins absorb ultraviolet light energy with an absorption maximum at about 2800 A. in a range of 2800 to 3200 A.

(3) The average amount of DNA in the nucleus and the volume of the nucleus are greater in a cancer cell than in a normal cell.

(4) The increased protein synthesis rate of a cancer cell results in a greater concentration of cytoplasmic RNA than in a normal cell.

The present invention is based on the measurement of the total absorption of radiant energy in the ultraviolet wavelength region by normal and abnormal cells and on the discovery that the total absorption of a normal cell may be used as a criterion for detecting the presence of abnormal or cancerous cells. The present invention is further based on the following criteria which relate to the response produced by normal and abnormal cells when irradiated by ultraviolet light.

(a) The total absorption of radiant energy by an abnormal or cancerous cell is greater than the total absorption of radiant energy by a normal cell when the radiant energy irradiating the cell is in a range of wavelengths which is absorbed by a nucleic acid such as DNA or RNA.

(b) The difference in the total absorption of radiant energy by an abnormal or cancerous cell is greater than the difference in the total absorption of radiant energy by a normal cell when cells are irradiated by radiant energy in first and second wavelength ranges; the first wavelength range being one which is significantly absorbed by a nucleic acid and the second wavelength range being one which is outside of the range of wavelength which are significantly absorbed by a nucleic acid.

(c) Debris, which may take many forms in a specimen, tends to completely absorb radiant energy in all wavelength ranges thereby giving a false indication of the presence of cancer cells. This criterion combined with the above criteria eliminates the possibility of classifying debris as an abnormal cell and presents a more accurate determination of the presence of abnormal cells.

By utilizing the above-mentioned criteria in conjunction with processing apparatus, it is possible to obtain enhanced indications of the presence of abnormal cells; the indications produced by normal cells, for example, being utilized as a norm or datum for the measurements. Under such circumstances the total absorption information relating to the abnormal or cancerous cell is enhanced to such a degree that their presence can be detected with little or no possibility of error and without the use of highly skilled personnel required by prior art techniques. It should be appreciated that certain measurements indicated herein can be made by skilled personnel, but that accurate measurements such as the difference in total absorption at two wavelengths by normal and abnormal cells appear to be more susceptible of automatic or electronic detection.

It is, therefore, an object of this invention to provide methods and apparatus for the diagnosis of biological specimens.

Another object is to provide methods and apparatus for the classification of cellular specimens.

Another object is to provide methods and apparatus which are adapted to the automatic diagnosis of cancer.

A further object is to provide a measurement technique by which cancer cells may be distinguished from normal cells.

A still further object is to provide methods and apparatus which can be applied to the determination of the total absorption of radiant energy by a nucleic acid present in normal and abnormal cells.

Yet another object is to provide methods and apparatus for detecting the nucleic acid content of cells by subjecting normal and abnormal cells to radiant energy at wavelengths that are absorbed by a nucleic acid and to energy at wavelengths which is not absorbed by nucleic acids.

A further object is to provide methods and apparatus which incorporate processing techniques and devices which permit the automatic detection of the presence of cancer cells by enhancing signals indicative of the total absorption of radiant energy which are not detectible by a human observer.

A feature of this invention is the utilization of a source of radiant energy in conjunction with means for immersing at least a single cell from a specimen in the radiant energy. Apparatus responsive to the total absorption of radiant energy in at least a given wavelength provides output signals representative of normal and abnormal cells in the specimen.

Another feature of this invention is the utilization of a source of radiant energy in conjunction with means for immersing at least a single cell in the radiant energy. Apparatus responsive to the total absorption of the radiant energy in first and second wavelength ranges provide signals representative of normal and abnormal cells.

Another feature of this invention is the utilization of the isolating means for selecting first and second wavelength ranges out of the available radiant energy and apparatus for converting the radiant energy into electrical signals. Amplifiers responsive to the signals provide outputs which are indicative of the presence of abnormal cells.

Another feature is the utilization of normalizing means which suppress signals relating to the total absorption of radiant energy by normal cells.

Still another feature is the utilization of processing means coupled to the amplifiers whereby signals relating to the total absorption of radiant energy in first and second wavelength ranges are enhanced to provide an indication of the presence of abnormal cells.

Still another feature of this invention is the utilization of a method which comprises the steps of providing a source of radiant energy, immersing a cell from a specimen in the radiant energy and detecting signals representative of the total absorption of the radiant energy in at least a given range of wavelengths by normal and abnormal cells.

Yet another feature of this invention is the utilization of a method for detecting abnormalities in cell specimens comprising the steps of providing a source of radiant energy, immersing at least a single cell from the specimen in the radiant energy, and detecting the total absorption of the radiant energy in first and second ranges of wavelengths by normal and abnormal cells to provide signals representative of both types of cells.

The foregoing and other objects, features, and advantages of the invention will be apparent from the following more particular description of a preferred embodiment of the invention as illustrated in the accompanying drawings.

Figure 3:
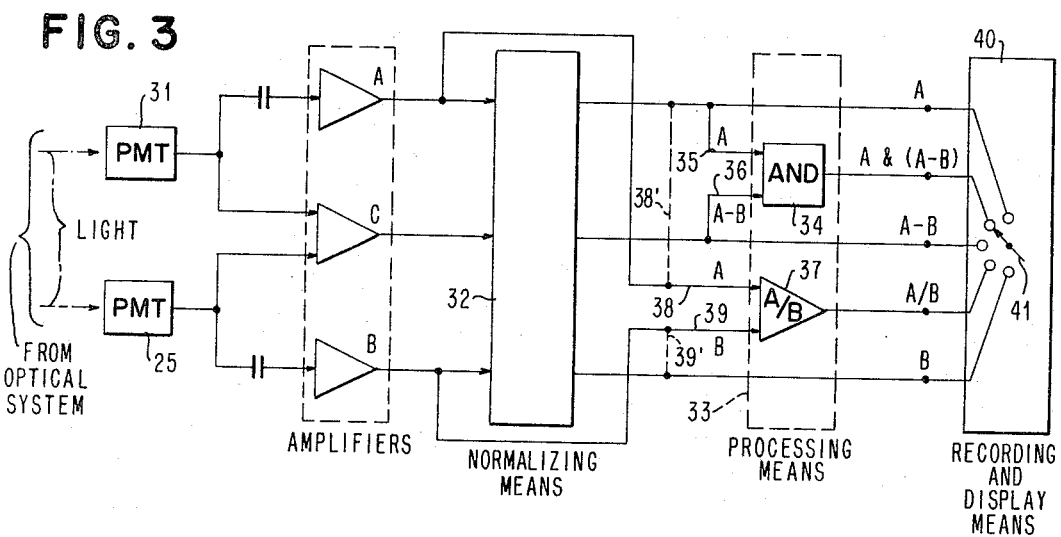

FIG. 3 is a diagram of embodiments of apparatus for diagnosing cancer which provide for accurate and unambiguous detection of normal cells by utilizing signals representing the difference in absorption at two wavelengths (A—B); the absorption at a single wavelength and the difference in absorption at two wavelengths ((A) and (A—B)); and the ratio of absorptions at two wavelengths (A/B) for normal and abnormal cells.

Figure 1:
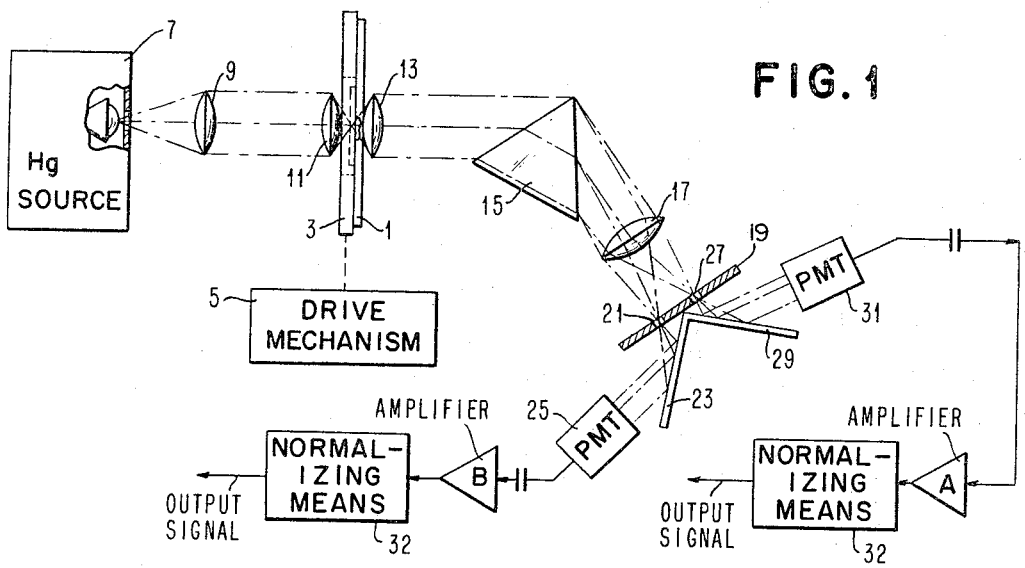
FIG. 1 is a diagram of an embodiment of an apparatus for diagnosing cancer which utilizes the total absorption of ultraviolet light for both normal and abnormal cells to detect abnormal or cancerous cells.

The invention is paritcularly described with respect to the diagnosis of cervical cancer but is also useful in the diagnosis of many types of cancer and for isolating abnormal cells in blood and other body fluids. Smears are obtained and fixed and stained according to the Papanicolaou technique but quartz slides and cover slips may be substituted for the normally used glass slides. Staining highlights the morphology of the cell for better visual confirmation of malignancy, but it is not necessary that the cells be stained to practice the technique of this invention. In FIG. 1, the specimen is located on slide 1 which is held by a frame 3 that is mechanically moved by a drive mechanism 5. The slide 1 undergoes a sequence of relatively high speed vertical movements as it is translated in the horizontal direction at a relatively low speed. In this manner, a fixed position optical system is able to isolate any one cell from a group of cells on slide 1.

A low pressure mercury light source 7 supplies radiant energy at a number of wavelengths including 2537 A. and 3130 A. which are prominent for this type of source. The ultraviolet light energy at 2537 A. is within the range of wavelengths (2500–2800 A.) that are substantially absorbed by nucleic acids and the light energy at 3130 A. is substantially without this range. The wavelength of the energy that is not to be absorbed by nucleic acids is not critical, the invention having been successfully operated at a wavelength of 3130 which is near the wavelength of maximum absorption for cellular protein. Any wavelength in the range 2800–3200 A. will provide good results.

Figure 2:
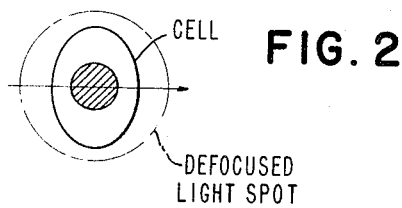
FIG. 2 shows the relationship between a cell and the size of a spot of ultraviolet light in which the cell is immersed.

The light emanating from source 7 is collimated by a lens 9 and is focused on the specimen by a microscopic objective 11. By adjusting the position of lens 9 with respect to the source 7, a spot of defocused light only slightly larger than a cell itself can be obtained so that a single cell is effectively isolated from other cells and immersed in radiant energy. FIG. 2 shows the relationship of a cell to the size of the defocused spot of radiant energy. The radiant energy that is transmitted by the specimen is applied through another microscope objective 13 to a prism 15. The prism separates the light energy at the different wavelengths and a lens 17 focuses the energy at the plane of a stop 19. The short wavelength energy at 2537 A. (in the nucleic acid absorption band) is passed through an aperture 21 in stop 19 and reflected by a mirror 23 to a photomultiplier 25. The long wavelength energy at 3130 A. (outside of the nucleic acid absorption band) is passed through another aperture 27 in stop 19 and is reflected by a mirror 29 to a photomultiplier 31. The optical system described above is comprised of commercially available and well-known components. A text describing the operation of components of this type is entitled Fundamentals of Optics, by Francis A. Jenkins and Harvey E. White, Third Edition, published by the McGraw-Hill Book Company, New York, 1957. The operation of the prism 15 is described in detail in this reference at page 301. The optical system shown in FIG. 1 may be modified in many obvious ways. For example, the prism arrangement may be replaced by a dichroic mirror or a filter arrangement and either or both mirrors 23 and 29 can be eliminated. In addition, instead of moving the specimen with a drive mechanism, the specimen can be fixed in position and scanned by a movable beam of energy from a Nipkow disc scanner or in a flying spot cathode ray tube scanner. A source that provides energy at unrequired wavelengths as well as at required wavelengths can be used, as the stop 19 will prevent this energy from reaching the photomultiplier. Furthermore, the system can utilize light energy reflected by a specimen instead of the transmitted energy.

The photomultipliers 25 and 31 of FIG. 1 generate signals whose amplitude is proportional to the absorption of radiant energy at given wavelengths when a cell is immersed in radiant energy. Experiments have shown that the total absorption by the abnormal cell at a wavelength of 2537 A. is the greater of the two absorptions. Since the total absorption of ultraviolet light by the abnormal cell is greater at a single frequency than that of a normal cell, any comparison of normal and abnormal cells using the value of absorption by a normal cell as a reference should indicate the presence of abnormal cells. While it is true that the total absorption of cancer cells at a single wavelength which is absorbed by a nucleic acid is greater for an abnormal cell than for a normal cell and that the abnormal cells are detectable by measuring the amount of absorption, in many cases because of variations in cell size and cell overlapping, the difference between normal and abnormal cells is so small that, as a practical matter, abnormal cell detection can be obtained only with difficulty. It should also be appreciated that in any specimen cellular debris and other unwanted materials appear with rather high frequency. Thus, using the value of absorption for normal cells as a reference in some normalizing circuit 32 associated with amplifier A of FIG. 1 so that only signals of an amplitude larger than that obtained for normal cells are passed does not necessarily provide for accurate detection of abnormal cells. Any debris or other material which would completely block the incident radiation would, of course, provide a signal having an amplitude greater than that provided by a normal cell and would be indicative of the presence of abnormal cells. Since such errors cannot be tolerated, the single frequency scheme, in the absence of circuitry which would indicate that a particular signal was due to debris, is applicable only to use with specimens which are relatively free of debris.

To overcome the limitations imposed on the detection of abnormal cells by debris in the specimen, technique shown in FIG. 3 utilizing the outputs of photomultipliers 25 and 31 can be substituted. One technique is to introduce the D.C. level outputs of photomultipliers 25 and 31 in a standard D.C. signal difference amplifier, indicated at C in FIG. 3, such that an output is provided when a difference between the two input signals exists. It should be recalled that at a wavelength of 2537 A. strong absorption by nucleic acids (DNA or RNA) takes place and that the absorption by abnormal cells is greater than by normal cells. Utilizing a second wavelength, one which is strongly absorbed by cellular protein, it can be shown that the absorption by the normal and abnormal cells at 3130 A., for instance, is only slightly greater for abnormal cells. From this, it follows, that the difference in total absorption at first and second wavelengths is greater for abnormal or cancerous cells than for normal cells. By normalizing the output of difference amplifier C in FIG. 3 by applying a bias proportional to the difference in total absorption for normal cells at first and second wavelengths, only signals representative of the presence of abnormal cells will be transmitted to an output. Normalizing means 32 coupled to the output of amplifiers A, B, C, may be a voltage source which applies an appropriate bias to the amplifiers such that signals relating to normal cells are suppressed and signals relating to abnormal cells are transmitted. Normalizing means 32 may also be Schmitt trigger circuits or any other normalizing circuit well-known to those skilled in the electronics art.

It should be appreciated, at this point, that by utilizing wavelengths of ultraviolet light which are sensitive to different cell constituents that it is possible to eliminate any ambiguities which might arise as a result of the presence of debris in a specimen being tested. Thus, where a piece of debris is irradiated, all wavelengths of light will be blocked and the output of difference amplifier C will be zero. In this manner, therefore, it is possible to eliminate ambiguities while simultaneously obtaining a positive indication of the presence of abnormal cells based on the fact that the difference in total absorption at two wavelengths of ultraviolet light is greater for abnormal cells than for normal cells. While it has been indicated thus far that the normalizing criterion is the value of total absorption for normal cells, it should be appreciated that this criterion is not critical and that the normalizing criterion may be increased or decreased depending on the sensitivity of measurements desired.

To further insure high accuracy in the detection of abnormal or cancerous cells, signals from amplifiers A, B, C, are processed in processing means shown generally at 33. One such processing means is an "and" gate 34 of conventional design. "And" gate 34 is responsive to the simultaneous presence of signals at its input terminals 35 and 36. A signal at terminal 35 indicates that either an abnormal cell is present or that debris has been detected. A signal at terminal 36, from difference amplifier C indicates that only an abnormal cell is present eliminating the possibility of the presence of debris. The output of "and" gate 34 provides an enhanced indication of the presence of abnormal cells by simultaneously utilizing two criteria which are indicative of the presence of abnormal cells.

Another processing means 33 which provides enhanced indications of the presence of abnormal cells is ratio amplifier 37 shown in FIG. 3. The use of ratio amplifier 37 is based on the fact that the total absorption in two wavelength ranges by abnormal cells is greater than the total absorption in two wavelength ranges by normal cells. However, it is also known that the total absorption in the wavelength range of 2500 to 2800 A. is greater than in the wavelength range of 2800 to 3200 A. From this, it follows that for abnormal cells an output much greater than unity is obtainable when the ratio of the signals from amplifiers A and B is taken in ratio amplifier 37. Thus, a non-normalized signal from amplifier A, is provided at terminal 38 of ratio amplifier 37 and, a non-normalized signal from amplifier B is provided at terminal 39 of ratio amplifier 37.

When normal cells are detected, since the outputs in the two wavelength ranges are substantially equal, an output from ratio amplifier 37 should be equal to unity or exceed this value only slightly. When abnormal cells are detected, since there is a substantial difference in total absorption in two wavelength ranges, the output from ratio amplifier 37 will be much greater than unity. This output, of course, clearly indicates the presence of cancerous or abnormal cells and eliminates the possibility of a spurious indication due to debris. Amplifier 37 may, of course, be fed with normalized signals from normalization means 32 as shown by dotted lines 38' and 39'. In this way, only signals due to abnormal cells and debris will be transmitted and an output in excess of unity eliminates the cellular debris and provides a positive indication of the presence of abnormal cells.

In FIG. 3, a recording and display means 40, which may be an oscilloscope, a chart recorder, or other display device, is shown connected to the outputs of amplifiers A, B, C, and to the outputs of "and" gate 34 and ratio amplifier 37. By this means a visual or audio signal may be recorded and instantaneously transmitted or may be stored for subsequent playback and display. A switch 41 may be utilized to select any of the available outputs.

The above-described method and apparatus differs from prior art arrangements and methods in that it provides for the measurement of the total absorption in at least a wavelength range of ultraviolet light, which range is substantially absorbed by the presence of the nucleic acids DNA and RNA, of an isolated cell. The present apparatus also includes methods and means for enhancing abnormal cell indications and for preventing ambiguous indications.

While the invention has been particularly shown and described with reference to a prefered embodiment thereof, it will be understood by those skilled in the art that various changes in form and details may be made therein without departing from the spirit and scope of the invention.

What is claimed is:

1. A method for detecting abnormalities in a cell comprising the steps of:
   immersing said cell in radiant energy having a first wavelength which is responsive to the presence of a nucleic acid to provide a signal indicative of the total amount of said nucleic acid alone in said cell;
   immersing said cell in radiant energy having a second wavelength which is responsive to cellular material other than said nucleic acid to provide a signal indicative of the total amount of said cellular material only in said cell, and
   identifying said cell as an abnormal cell when the signal at said first wavelength differs from the signal at said second wavelength by a given amount.

2. A method according to claim 1 wherein the step of identifying said cell as an abnormal cell includes the steps of taking the ratio of the signals and recognizing said cell in an abnormal cell when the ratio exceeds a given amount.

3. A method according to claim 1 wherein the step of identifying said cell as an abnormal cell includes the steps of taking the difference of said signals and recognizing said cell as an abnormal cell when the difference exceeds a given amount.

4. A method according to claim 1 wherein said first and second wavelengths are in the ultraviolet range.

5. A method according to claim 1 wherein said first wavelength is in a range which is substantially absorbed by DNA and RNA, and said second wavelength is in a range outside a wavelength range absorbed by DNA and RNA.

6. A method according to claim 1 wherein said first wavelength is in a range which is substantially absorbed by DNA and RNA and said second wavelength is in a range which is substantially absorbed by cellular protein.

7. A method according to claim 1 wherein said first wavelength is in a range of 2500 to 2800 A. and said second wavelength is in a range of 2800 to 3200 A.

8. A method according to claim 1 wherein said first wavelength is 2537 A. and said second wavelength is 3130 A.

9. A method according to claim 1 wherein the step of immersing a single cell in said radiant energy includes the steps of defocusing said radiant energy to produce a spot of radiant energy of sufficient size to encompass a cell in said specimen, and raster scanning said specimen to produce relative motion between said specimen and said light spot whereby individual cells are sequentially immersed in said radiant energy.

10. A method according to claim 1 wherein the step of detecting said cell as an abnormal cell includes the steps of isolating first and second wavelengths of said radiant energy, converting radiant energy at said first and second wavelengths into electrical signals and amplifying the resulting electrical signals to indicate the presence of abnormal cells.

11. A method according to claim 10 wherein the step of isolating first and second wavelengths includes the steps of directing said radiant energy along first and second paths and selecting only said first and second wavelengths by a stop interposed in said paths.

12. A method according to claim 11 further including the step of normalizing whereby signals relating to the tital absorption of radiant energy at said first and second wavelengths by normal cells are suppressed and signals relating to the total absorption of radiant energy at said first and second wavelengths by abnormal cells are transmitted.

13. A method according to claim 12 further including the steps of processing signals relating to the total absorption of radiant energy at said first and second wavelengths whereby signals resulting from said amplifying provide an enhanced indication of the presence of abnormal cells.

14. A system for detecting abnormalities in cell specimen comprising a source of radiant energy, means for immersing a single cell from said specimen in said radiant energy, means for isolating first and second wavelength ranges of said radiant energy, means for converting radiant energy in said wavelength ranges into electrical signals, amplification means including first, second and third amplifiers, said first amplifier being coupled to said means for converting to transmit signals relating to the total absorption of radiant energy by normal, abnormal cells and debris, said second amplifier being coupled to said means for converting to transmit signals relating to the total absorption of radiant energy by normal, abnormal cells and debris in said second wavelength range, said third amplifier being coupled to said means for converting to transmit signals relating to the difference in total absorption of radiant energy by normal and abnormal cells and debris in said first and second wavelength ranges, first, second and third normalizing means coupled to said first, second and third amplifiers, respectively, to suppress signals relating to the total absorption of radiant energy by normal cells in said first wavelength range, said second wavelength range, and signals relating to the difference in total absorption of radiant energy by normal cells in said first and second wavelength ranges, respectively, and means for processing signals relating to the total absorption of radiant energy by normal and abnormal cells in said first and second wavelength ranges coupled to at least two of said first, second and third amplifiers to provide an enhanced indication of the presence of abnormal cells.

15. A system according to claim 14 wherein said means for processing includes an "and" gate coupled to said first and third amplifiers responsive to the presence of signals relating to the total absorption of radiant energy by abnormal cells in said first wavelength range and to the difference in total absorption of radiant energy by abnormal cells in said first and second wavelength ranges, respectively, to provide an enhanced indication of the presence of abnormal cells.

16. A system according to claim 14 wherein said means for processing includes a ratio amplifier coupled to said first and second amplifiers, responsive to the ratio of signals relating to the total absorption of radiant energy by abnormal cells, normal cells and debris in said first and second wavelength ranges to provide an enhanced indication of the presence of abnormal cells.

References Cited

UNITED STATES PATENTS

| | | |
|---|---|---|
| 2,395,489 | 2/1946 | Major et al. |
| 2,790,438 | 4/1957 | Taplin et al. _____ 128—2 |
| 3,210,546 | 10/1965 | Perron _____ 250—83.3 |

OTHER REFERENCES

Mellors et al.: Nuclear Acid Content of the Squamous Cancer Cell, Science, vol. 116, Sept. 12, 1952, pp. 265–269.

Mellors et al.: A Microfluorometric Scanner, Science, vol. 114, Oct. 5, 1951, pp. 356–360.

RALPH G. NILSON, *Primary Examiner.*

S. ELBAUM, *Assistant Examiner.*